(12) United States Patent
Kawai (10) Patent No.: US 11,408,217 B2
(45) Date of Patent: Aug. 9, 2022

(54) CABLE ROUTING STRUCTURE AND WINDOW-GLASS LIFTING DEVICE USING SAME

(71) Applicant: HI-LEX CORPORATION, Hyogo (JP)

(72) Inventor: Shingo Kawai, Hiroshima (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 17/255,085

(22) PCT Filed: Jun. 28, 2019

(86) PCT No.: PCT/JP2019/025783
§ 371 (c)(1),
(2) Date: Dec. 22, 2020

(87) PCT Pub. No.: WO2020/004615
PCT Pub. Date: Jan. 2, 2020

(65) Prior Publication Data
US 2021/0262265 A1    Aug. 26, 2021

(30) Foreign Application Priority Data
Jun. 29, 2018 (JP) .............................. JP2018-125271

(51) Int. Cl.
*E05F 11/46* (2006.01)
*E05D 15/16* (2006.01)
(Continued)

(52) U.S. Cl.
CPC .............. *E05D 15/165* (2013.01); *B60J 1/17* (2013.01); *E05F 15/697* (2015.01);
(Continued)

(58) Field of Classification Search
CPC ........ E05D 15/165; E05D 15/686; B60J 1/17; E05F 5/697; E05F 11/483;
(Continued)

(56) References Cited

U.S. PATENT DOCUMENTS 4,494,336 A * 1/1985 Ishii ...................... E05F 11/382
49/352
4,502,247 A * 3/1985 Kobayashi ................. B60J 1/17
49/352
(Continued)

FOREIGN PATENT DOCUMENTS

EP    2940239 A1    11/2015
FR    2831227 A1 *  4/2003 ......... B60R 16/0215
(Continued)

OTHER PUBLICATIONS

International Search Report from International Application No. PCT/JP2019/025783 dated Jul. 30, 2019.

*Primary Examiner* — Jerry E Redman
(74) *Attorney, Agent, or Firm* — Brundidge & Stanger, P.C.

(57) ABSTRACT

Provided is a cable routing structure in which a cable guide member includes a support portion including an edge portion on one side and an edge portion on another side, a first erected portion erected on a side of the edge portion on the one side, and a second erected portion erected on a side of the edge portion on the other side. The first erected portion includes an engaging portion engaging with a base member, the second erected portion includes a connecting portion connected to the base member, and a distance in which a linear portion that is intermediate between both ends of a cable is provided between the first erected portion and the second erected portion. The base member includes an engaged portion being engaged with the engaging portion of the first erected portion.

5 Claims, 5 Drawing Sheets

(51) Int. Cl.
 *E05F 15/697* (2015.01)
 *B60J 1/17* (2006.01)
(52) U.S. Cl.
 CPC ..... *E05Y 2201/434* (2013.01); *E05Y 2201/64* (2013.01); *E05Y 2201/654* (2013.01); *E05Y 2201/684* (2013.01); *E05Y 2900/55* (2013.01)
(58) Field of Classification Search
 CPC .......... E05Y 2201/434; E05Y 2201/64; E05Y 2201/684; E05Y 2201/662; E05Y 2900/55
 USPC .......................................................... 49/352
 See application file for complete search history.

(56) References Cited

U.S. PATENT DOCUMENTS

| | | | | |
|---|---|---|---|---|
| 4,663,886 A * | 5/1987 | Nakamura | ............ | E05F 11/382 49/360 |
| 4,700,508 A * | 10/1987 | Kollner | ................ | E05F 11/382 49/352 |
| 4,805,346 A * | 2/1989 | Gergoe | ................ | E05F 11/485 49/352 |
| 4,888,916 A * | 12/1989 | Hess | ..................... | E05F 11/483 49/352 |
| 5,855,093 A * | 1/1999 | Medebach | ................ | F16C 1/22 49/352 |
| 5,970,658 A * | 10/1999 | Smith | ................ | E05D 13/1207 49/348 |
| 6,050,029 A * | 4/2000 | Simon | ................... | E05F 11/483 49/352 |
| 6,609,334 B1 * | 8/2003 | Gutermuth | ............ | E05F 11/488 49/375 |
| 7,617,633 B2 * | 11/2009 | Shimura | ................ | E05F 11/382 49/348 |
| 7,975,434 B2 * | 7/2011 | Smith | ................... | E05F 11/385 49/352 |
| 8,215,060 B2 * | 7/2012 | Sasaki | ................... | E05F 11/485 49/322 |
| 8,881,457 B2 * | 11/2014 | Matsushita | ........... | E05F 11/382 49/352 |
| 9,822,568 B2 * | 11/2017 | Matsushita | ........... | E05F 15/689 |
| 10,577,849 B2 * | 3/2020 | Arimoto | ............... | E05F 15/689 |
| 10,927,589 B2 * | 2/2021 | Kashiwabara | ......... | E05F 15/689 |
| 2010/0031576 A1 * | 2/2010 | Sasaki | ................... | E05F 11/485 49/360 |
| 2017/0268273 A1 * | 9/2017 | Matsushita | ........... | E05F 11/382 |
| 2019/0186188 A1 * | 6/2019 | Arimoto | ............... | E05F 15/689 |
| 2019/0195000 A1 * | 6/2019 | Arimoto | ................... | B60J 1/17 |

FOREIGN PATENT DOCUMENTS

| | | |
|---|---|---|
| JP | 02272186 A | * 11/1990 |
| JP | 05163868 A | * 6/1993 |
| WO | 2014103816 A1 | 7/2014 |

* cited by examiner

FIG. 5

CABLE ROUTING STRUCTURE AND WINDOW-GLASS LIFTING DEVICE USING SAME

TECHNICAL FIELD

The present invention relates to a cable routing structure, and a window-glass raising and lowering device using the cable routing structure.

BACKGROUND ART

In a moving device that moves an object by transmitting a driving force to the object via a cable, such as a cable-type window-glass raising and lowering device, the cable is routed along a base member, such as a guide rail, that guides the object.

In this case, the cable is routed between one side and another side of a base member in a state in which tension is applied to the cable. In a case where there is no member that is in contact with the cable in a state of being stretched by the tension between one side and the other side, however, the cable easily vibrates. As the member that is in contact with the cable in a state of being stretched by the tension, such a cable guide that is in contact with a cable in a state in which the cable guide does not inhibit movement of the cable has been proposed (e.g., Patent Literature (hereinafter, referred to as PTL) 1).

Such a cable guide previously forms a closing structure from which it is usually difficult for a cable led into the inside of the closing structure to come detached, and the cable guide is attached to the guide rail, which is the base member, so as to be located in a predetermined position with respect to the guide rail.

Accordingly, since the cable when used in a usual manner does not come detached from the closing structure of the cable guide, it is possible to fulfill a function of coming in contact with the cable, such as preventing the cable from vibrating like a string to generate abnormal noise.

CITATION LIST

Patent Literature

PTL 1
WO 2014/103816

SUMMARY OF INVENTION

Technical Problem

However, the aforementioned closing structure needs an lead-in mechanism for leading the cable therein. For example, in a case where an elastic member is used in the lead-in mechanism, the cable may come detached when an external force larger than a usual external force is applied to the elastic member during conveyance, and thus, such a management that the external force larger than the usual external force is not applied thereto during conveyance is necessary. That is, in the moving device that moves an object by the transmission to the object via a cable, such a cable routing structure is required that uses a cable guide that is easily attached and from which the cable cannot easily come detached.

An object of the present invention is to provide a cable routing structure using a cable guide that is easily attached and from which a cable cannot easily come detached, and a window-glass raising and lowering device using the cable routing structure.

Solution to Problem

The cable routing structure of the present invention includes: a base member; a cable that is routed along the base member; and a cable guide member that is attached to the base member and supports a linear portion of the cable, the linear portion being intermediate between both ends of the cable, wherein the cable guide member includes a support portion including an edge portion on one side and an edge portion on another side, a first erected portion erected on a side of the edge portion on the one side, and a second erected portion erected on a side of the edge portion on the other side, wherein the first erected portion includes an engaging portion that engages with the base member, the second erected portion includes a connecting portion that is connected to the base member, and a distance in which the linear portion is disposed is provided between the first erected portion and the second erected portion, the base member includes an engaged portion that is engaged with the engaging portion of the first erected portion, in a routing state in which the cable is routed with the cable guide member being attached to the base member, the cable guide member and the base member form an engagement relationship in which the engaging portion engages with the engaged portion in a direction of a force received by the support portion by abutment of the cable on the support portion, and in the routing state, the cable guide member and the base member form a closed structure around an axis of the cable disposed on the support portion, the closed structure not allowing the cable to be detached.

The window-glass lifting and lowering device of the present invention is a window-glass raising and lowering device using the cable routing structure that has the aforementioned configuration, the window-glass raising and lowering device including: a guide rail for which the base member is used; a carrier member that is guided by the guide rail; a drive section; and the cable, with a configuration in which the cable is connected to the carrier member and the drive section, and the carrier member is capable of moving by driving of the drive section.

Advantageous Effects of Invention

According to the present invention, it is possible to realize a cable routing structure using a cable guide that is easily attached and from which a cable cannot easily come detached.

DESCRIPTION OF EMBODIMENTS

Hereinafter, an embodiment of the present invention will be described in detail with reference to the accompanying drawings.

A cable routing structure of the present embodiment is configured, for example, such that a cable guide member is attached to a base member that is used as a guide rail or the like, and a cable that is routed along the base member does not deviate from a routing path of the cable along the base member.

The cable routing structure of the present embodiment can be used in any device as long as the device regulates that the cable routed along the base member does not deviate from the path along the base member. For example, the cable routing structure of the present embodiment is applicable to a device or the like that moves a carrier member connected to a cable, by moving the cable. The cable routing structure can be applied, for example, to a window-glass raising and lowering device that raises and lowers a window-glass connected to a carrier member.

In the present embodiment, a description will be given by exemplifying a case where the cable routing structure is used in a window regulator as a window-glass raising and lowering device using a cable routing structure.

[Overall Configuration of Window Glass Raising and Lowering Device]

Figure 1:
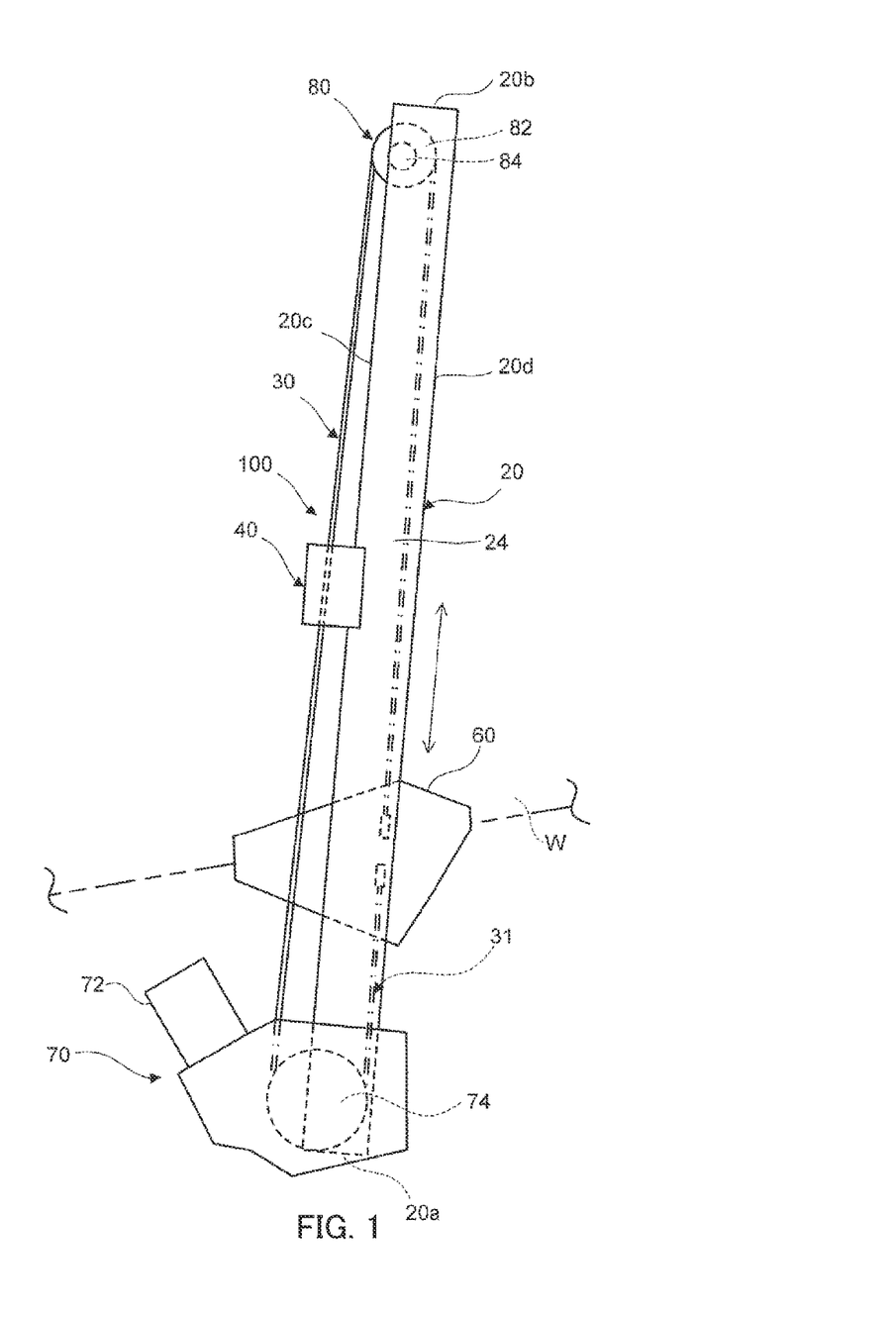
FIG. 1 is a front view schematically illustrating a window-glass raising and lowering device using a cable routing structure according to an embodiment of the present invention.
Figure 2:
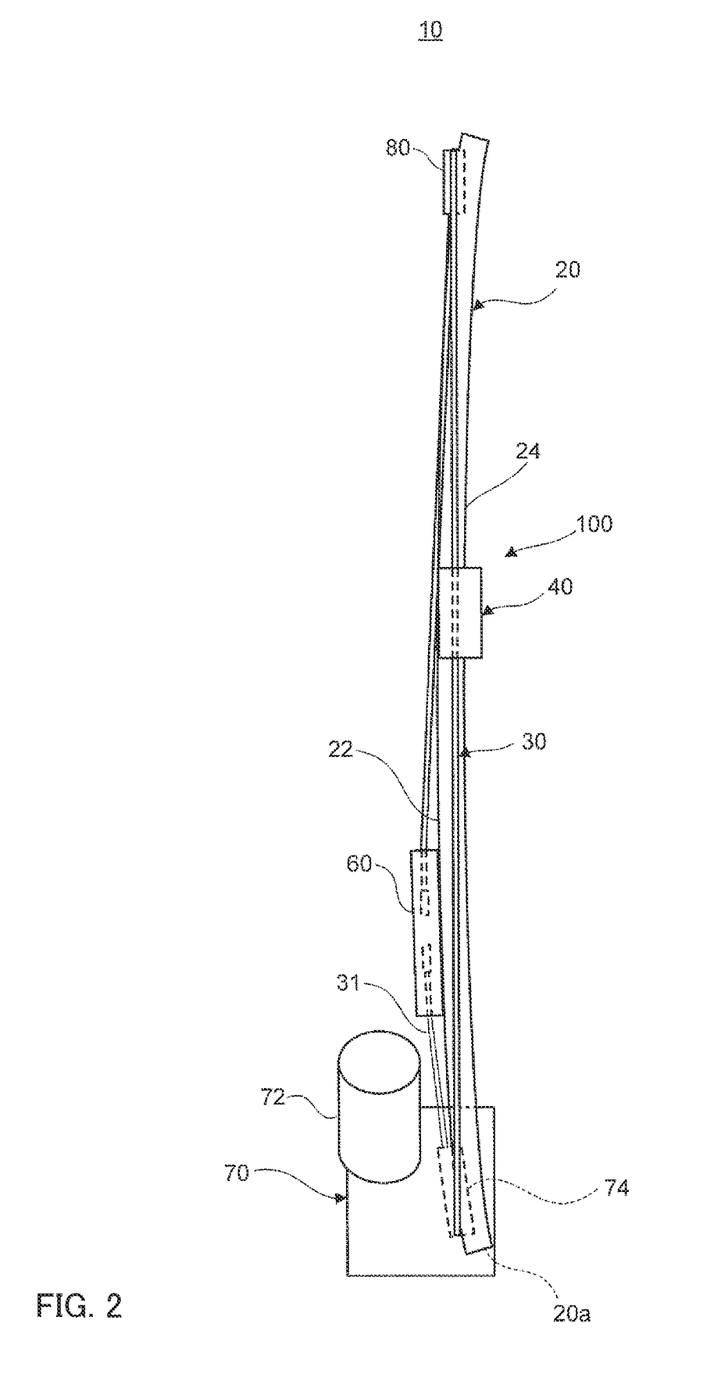
FIG. 2 is a left side view of the window-glass raising and lowering device illustrated in FIG. 1.

FIG. 1 is a front view schematically illustrating a window-glass raising and lowering device using a cable routing structure according to an embodiment of the present invention, and FIG. 2 is a left side view of the window-glass raising and lowering device illustrated in FIG. 1.

Window glass raising and lowering device 10 includes guide rail 20 that is used as a base member for movement, cable 30, cable guide member 40, carrier member 60 that is guided by guide rail 20, and drive section 70. Cable 30 is connected to carrier member 60 and drive section 70. Cable 30 is moved by driving of drive section 70, and carrier member 60 moves accordingly.

Window glass raising and lowering device 10 is a device that moves window-glass W connected to carrier member 60. Window glass raising and lowering device 10 of the present embodiment is, for example, fixed between an inner panel and an outer panel of a door of a vehicle (not illustrated), and raises and lowers a window of the door (for example, window-glass W) by moving the window.

A moving direction of carrier member 60 is a vertical direction that is defined by using as a reference a raising and lowering direction of window-glass W that is an object to be moved (hereinafter, referred to as "movement object"). Window glass raising and lowering device 10 raises and lowers window-glass W, thereby opening or closing an opening that is formed in an upper portion of a door panel in the vehicle.

[Guide Rail 20]

Guide rail 20 guides movement of carrier member 60, and movably supports carrier member 60. In guide rail 20, a rotation regulation portion, such as a rib, that restrains carrier member 60 from rotating in an axial direction of guide rail 20, is provided in a longitudinal direction.

In the present embodiment, guide rail 20 is a rail that is long in the moving direction of carrier member 60 and has substantially the same shaped cross section extending in the longitudinal direction.

Guide rail 20 includes one edge portion 20c, another edge portion 20d that is an edge portion opposite to one edge portion 20c, and one surface 22 and another surface 24 that are substantially parallel to an extending direction of cable 30.

In the present embodiment, guide rail 20 is curved such that a middle portion on a front side (corresponding to a side of one surface 22) has a protruding shape in a side view.

In guide rail 20, carrier member 60 is movably fitted into another edge portion 20d, and is supported to be freely movable on one surface 22 along another edge portion 20d.

For example, guide rail 20 is disposed so as to extend in a vertical direction. In guide rail 20, drum 74 is rotatably provided on a side of one end, which is a side of lower end 20a in this case, and direction-changing member 80 is disposed on a side of another end, which is a side of upper end 20b in this case. Note that, in the present embodiment, all of an extending direction of guide rail 20 and moving directions of cable 30 that is a raising cable and cable 31 that is a lowering cable are a vertical direction in accordance with the movement of carrier member 60 in the vertical direction, but is not limited thereto. When the moving direction of carrier member 60 is a direction different from the vertical direction, the extending direction of guide rail 20 and the moving directions of cables 30 and 31 may be any directions such as horizontal directions, for example. These moving directions can be appropriately set depending on a moving direction of the movement object.

In guide rail 20, cable guide member 40 is attached to one edge portion 20c such that cable guide member 40 protrudes on a side of another surface (for example, a rear surface illustrated in FIG. 1) 24 of guide rail 20. Note that, cable guide member 40 is attached to guide rail 20 via engaged portion 202 and connected portion 204 of guide rail 20 (see FIG. 3 and FIG. 4). Details of engaged portion 202 and connected portion 204 mentioned above will be described together with cable guide member 40 to be described later.

[Direction-Changing Member 80]

Direction-changing member 80 is a member that changes the moving direction of cable 30 on guide rail 20.

Of the cables (30, 31), one ends of which are connected to carrier member 60 and the other ends of which are connected to drum 74, cable 30 for raising that raises carrier member 60 is wound around direction-changing member 80.

Specifically, cable 30 for raising, which extends from drum 74 disposed on the side of lower end 20a of guide rail 20 toward the side of upper end 20b, is wound around direction-changing member 80, and direction-changing member 80 changes the moving direction of cable 30 for raising.

Direction-changing member 80 changes a direction in which cable 30 for raising extends, and motion of downwardly pulling a side of one end of cable 30 for raising is changed to motion of upwardly pulling a side of another end of cable 30 for raising.

Direction-changing member 80 includes, for example, pulley 82 around which cable 30 for raising is wound, and pulley shaft 84, on a side of one end of which pulley 82 is freely rotatably attached and which is fixed to upper end 20b of guide rail 20 on a side of another end of pulley shaft 84. Note that, a cable groove (not illustrated) around which cable 30 for raising is wound is formed in pulley 82. Specifically, two flanges having the same shape are provided on a disc outer periphery of pulley 82 that is a disk-shaped member, and a small diameter portion between these two flanges extends as the cable groove in a circumference direction. Pulley 82 is made of a resin, for example.

Pulley shaft 84 is a rotating shaft of pulley 82, and is fixed to guide rail 20, thereby causing pulley 82 to be freely rotatably supported by guide rail 20. Note that, a coming-off prevention member may be provided in the vicinity of pulley 82. The coming-off prevention member prevents cable 30 for raising, which is wound around the cable groove of pulley 82, from coming off and being detached from the cable groove of pulley 82 due to loosening of cable 30 for raising by weakening of the tension of cable 30 for raising or the like.

[Cables 30 and 31]

Cables 30 and 31 are members that move carrier member 60 in the vertical direction indicated by an arrow in FIG. 1.

As cables 30 and 31, it is possible to use publicly-known wires. For example, wires that are formed by twisting a plurality of at least one of metal element wires and resin fiber element wires can be used.

Cables 30 and 31 have flexibility that enables the directions of cables 30 and 31 to be changed by direction-changing member 80, for example.

Carrier member 60 is connected to the one ends of cables 30 and 31, and drive section 70 is connected to the other ends of cables 30 and 31.

In the present embodiment, cable 30 is a cable for raising, and cable 31 is a cable for lowering.

Cable 30 pulls carrier member 60 upward. Cable 30 is connected to carrier member 60 at one end of cable 30 and wound around pulley 82 of direction-changing member 80 above and connected to drum 74 of drive section 70 at another end thereof. In a region between drive section 70 and direction-changing member 80, cable 30 is disposed, with tension applied thereto, on a side of one edge portion 20c of guide rail 20, linearly along the vertical direction along one edge portion 20c.

In a region between direction-changing member 80 and carrier member 60, cable 30 is disposed, with tension applied thereto, on another edge portion 20d of guide rail 20, linearly along the vertical direction along another edge portion 20d of guide rail 20.

Cable 31 is disposed in a region between carrier member 60 and drive section 70. Cable 31 is connected to carrier member 60 at one end of cable 31, extends from carrier member 60 downward and connected to drum 74 of drive section 70 at another end thereof.

When drive section 70 drives so as to wind cable 30 around drum 74 to pull cable 30, carrier member 60 is pulled upward and raised. In this case, cable 31 is unwound from drum 74.

When drive section 70 drives so as to wind cable 31 around drum 74 to pull cable 31 downward, carrier member 60 is pulled downward and lowered. In this case, cable 30 is unwound from drum 74.

Thus, by the movement of cables 30 and 31 in the vertical direction, carrier member 60 moves in the vertical direction in conjunction with the driving of drive section 70.

[Carrier Member 60]

Carrier member 60 is moved by drive section 70 via cable 30.

Carrier member 60 is fitted into guide rail 20, and is guided by guide rail 20 to move along the extending direction of guide rail 20.

In the present embodiment, carrier member 60 is a carrier plate of the window regulator, holds a lower end portion of window-glass W, and is guided in the raising and lowering direction of window-glass W along guide rail 20.

Carrier member 60 moves between the side of the one end (the side of lower end 20a in FIG. 1) and the side of the other end (the side of upper end 20b in FIG. 1) of guide rail 20, and moves window-glass W, which is the movement object.

[Drive Section 70]

The other ends of the cables, specifically, another end of cable 30 and another end of cable 31 are connected to drive section 70, respectively.

Drive section 70 moves carrier member 60 upward and downward via cables 30 and 31.

Drive section 70 includes motor 72 that is electrically driven, drum 74, and a power transmission section (not illustrated) that transmits rotational motion of motor 72 to drum 74, such as a worm gear, for example. Drive section 70 rotationally drives motor 72 in a forward direction and in a backward direction, and drum 74 rotates in the forward direction and in the backward direction by the rotational driving.

In the present embodiment, drum 74 is rotatably held on the side of the one end of guide rail 20, which is the side of lower end 20a in FIG. 1. In the rotational driving of drive section 70, drum 74 rotates in the forward direction and in the backward direction. Cables 30 and 31 are wound around drum 74 in directions opposite to each other. Drum 74 winds cable 30 to pull cable 30 or winds cable 31 to pull cable 31 depending on a rotational direction of drum 74. Drum 74 unwinds cable 31 when drum 74 winds cable 30, and unwinds cable 30 when drum 74 winds cable 31. In the present embodiment, drive section 70 is provided in an end portion of guide rail 20, but may be disposed away from guide rail 20.

[Cable Guide Member 40]

Figure 3:
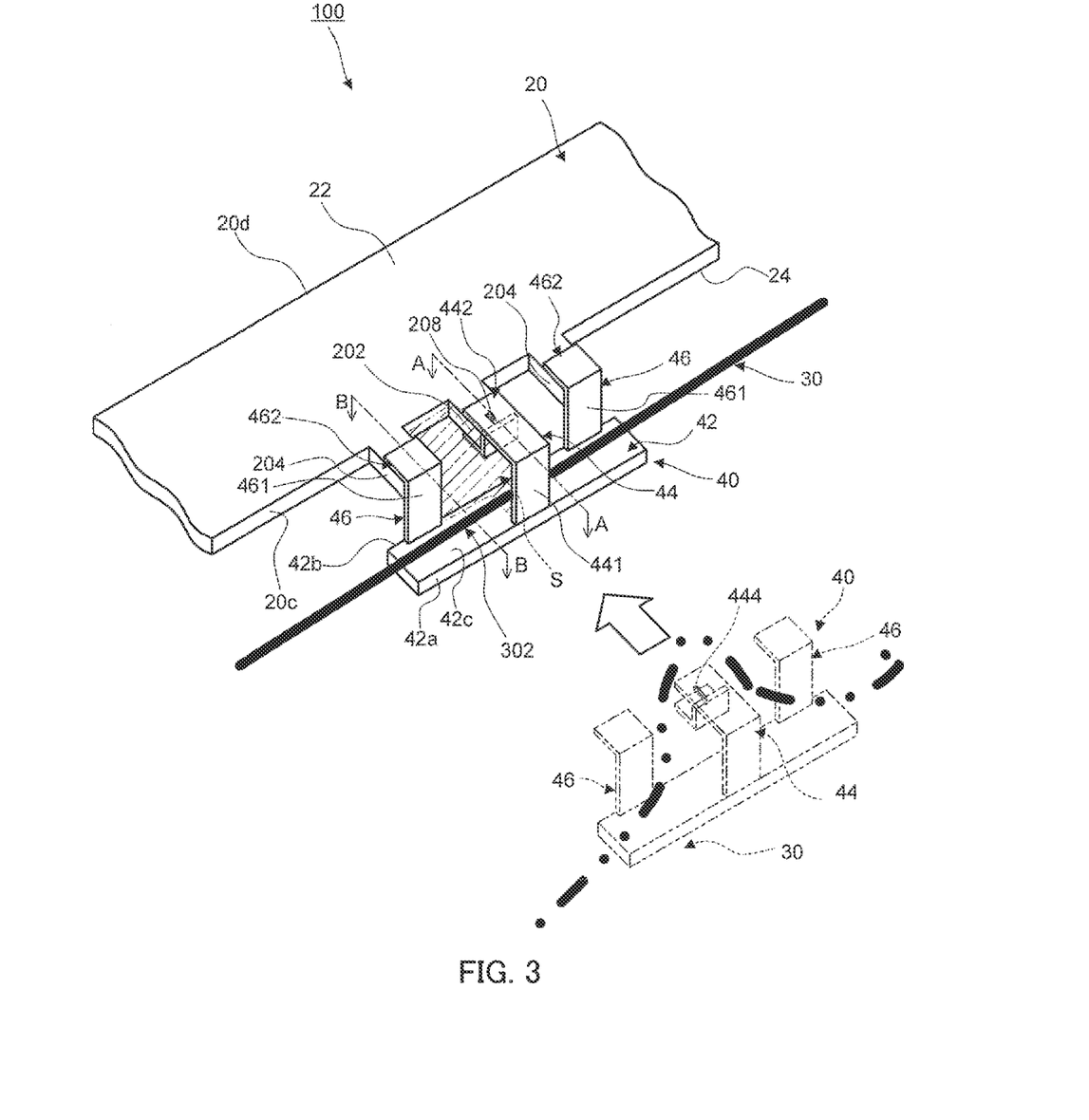
FIG. 3 is a perspective view schematically illustrating a configuration of a main portion of the cable routing structure in the window-glass raising and lowering device.
Figure 4A:
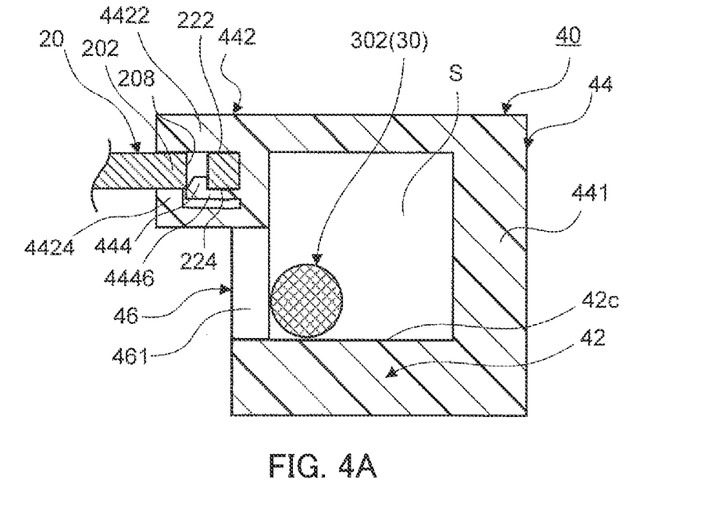
FIG. 4A is a cross-sectional view taken along line A-A in FIG. 3.
Figure 4B:
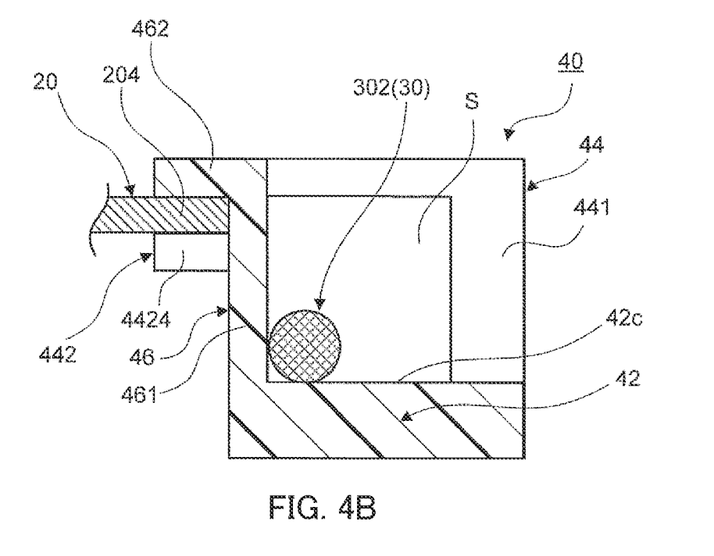
FIG. 4B is a cross-sectional view taken along line B-B in FIG. 3.

FIG. 3 is a perspective view schematically illustrating a configuration of a main portion of the cable routing structure in the window-glass raising and lowering device. FIG. 4A is a cross-sectional view taken along line A-A in FIG. 3, and FIG. 4B is a cross-sectional view taken along line B-B in FIG. 3.

Cable guide member 40 is attached to guide rail 20 for which the base member is used, and guides cable 30 such that cable 30 is routed along guide rail 20.

Cable guide member 40 and guide rail 20 regulate that cable 30 cannot be detached from a routing path of cable 30 along guide rail 20.

Cable guide member 40 supports linear portion 302 that is intermediate between both ends of cable 30 that is routed along guide rail 20.

In the present embodiment, the both ends of cable 30 are both ends that are separated from each other in a direction that extends along guide rail 20, and are parts that are connected to drum 74 and direction-changing member 80. In cable 30 routed along guide rail 20, linear portion 302 that is intermediate between the both ends of cable 30 means a linear part that is routed between drum 74 and direction-changing member 80.

Cable guide member 40 includes support portion 42 including edge portion 42a on one side and edge portion 42b on another side, first erected portion 44 erected on a side of edge portion 42a on the one side, and second erected portions 46 erected on a side of edge portion 42b on the other side.

Support portion 42 supports cable 30 such that cable 30 is routed on the routing path of cable 30.

In support portion 42, linear portion 302 that is a linear part of cable 30 is routed in a planar portion of support portion 42. Support portion 42 has a width in which edge portion 42a on the one side and edge portion 42b on the other side are positioned so as to sandwich linear portion 302 of cable 30 in a direction that intersects a routing direction of cable 30.

In the present embodiment, both ends of support portion 42 in a width direction are edge portion 42a on the one side and edge portion 42b on the other side, and the plate-like portion of support portion 42 is formed so as to extend in the extending direction of cable 30. The planar portion is a surface of a side on which first erected portion 44 and second erected portions 46 extend. In the present embodiment, the planar portion is surface 42c on a side, which faces cable 30, of support portion 42.

First erected portion 44 has a function of attaching cable guide member 40 to guide rail 20. Second erected portions 46 each have a function of connecting cable guide member 40 to guide rail 20.

In support portion 42, first erected portion 44 and second erected portions 46 are provided so as to be erected from the planar portion that supports cable 30.

When cable guide member 40 is attached to guide rail 20, first erected portion 44, and second erected portions 46 are disposed on both sides of linear portion 302 of cable 30 on support portion 42, respectively. First erected portion 44, second erected portion 46, and support portion 42 surround linear portion 302 of cable 30 from three sides.

First erected portion 44 and second erected portion 46 are disposed at a distance in which linear portion 302 of cable 30 is disposed between first erected portion 44 and second erected portion 46.

First erected portion 44 engages with guide rail 20, and second erected portions 46 are connected to guide rail 20.

In the present embodiment, first erected portion 44 engages with engaged portion 202 of guide rail 20, and second erected portions 46 are connected to connected portions 204 of guide rail 20.

Engaged portion 202 and connected portions 204 may be formed in any way as long as the configurations of engaged portion 202 and connected portions 204 allow the attachment of cable guide member 40. In the present embodiment, engaged portion 202 and connected portions 204 are plate-like portions that are projected so as to extend from one edge portion 20c in a lateral direction of guide rail 20.

First erected portion 44 includes first erected portion-main body 441 that protrudes from a side of edge portion 42a of support portion 42, and engaging portion 442 that is connected to a protruding end portion of first erected portion-main body 441 and engages with engaged portion 202 of guide rail 20.

First erected portion-main body 441 regulates separation of linear portion 302 of cable 30 on support portion 42 from cable guide member 40 due to movement of linear portion 302 from edge portion 42a on the one side to the outside.

In a routing state in which cable 30 is routed with cable guide member 40 being attached to guide rail 20, engaging portion 442 engages with engaged portion 202 of guide rail 20 in a direction of a force applied to support portion 42 by abutment of cable 30 on support portion 42.

By the engagement of engaging portion 442 with engaged portion 202, cable guide member 40 is in a state of being attached to guide rail 20 such that cable guide member 40 is not detached from guide rail 20.

Specifically, the routing state in which cable 30 is routed with cable guide member 40 being attached to guide rail 20 in the present embodiment is a state in which cable 30 supported by cable guide member 40 is installed in a tensile state between both lower end 20a and upper end 20b of guide rail 20, which is curved. That is, tension is applied to cable 30, a force for movement from the side of one surface 22 that is a protruding side to another surface 24 is added in guide rail 20, and cable 30 abuts on support portion 42. Thus, support portion 42 receives the force from cable 30. Engaging portion 442 engages with engaged portion 202 in the direction of the force received by support portion 42.

First erected portion 44 and second erected portion 46 are provided in support portion 42 and are separated from each other in a direction in which cable 30 extends.

In the present embodiment, two second erected portions 46 are provided in support portion 42 such that second erected portions 46 are separated from each other in the direction in which cable 30 extends and sandwich first erected portion 44.

Engaging portion 442 may be configured in any way as long as engaging portion 442 engages with guide rail 20 to fix cable guide member 40 to guide rail 20.

In the present embodiment, engaging portion 442 includes protrusion portion 444 that protrudes in a direction in which first erected portion 44 extends from support portion 42, and is capable of engaging with engaged portion 202 by inserting protrusion portion 444 into hole 208 provided in engaged portion 202. Hole 208 is provided in engaged portion 202 such that protrusion portion 444 is insertable into hole 208.

Specifically, engaging portion 442 includes first abutting portion 4422 that abuts on first surface 222 of engaged portion 202, second abutting portion 4424 that abuts on second surface 224 of engaged portion 202, and elastic piece 4446 is provided with protrusion portion 444 at a leading-end of elastic piece 4446.

Note that, first surface 222 and second surface 224 of engaged portion 202 are surfaces that are substantially parallel to a direction in which cable 30 is routed, and second surface 224 is opposite to first surface 222. In the present embodiment, first surface 222 and second surface 224 as mentioned above correspond respectively to one surface 22 and another surface 24 among front and rear surfaces of guide rail 20.

In the present embodiment, a direction of sandwiching by first abutting portion 4422 and second abutting portion 4424 is a thickness direction of the rail member, that is, guide rail 20, and is a direction intersecting both the routing direction of cable 30 and a width direction of guide rail 20 (a direction in which the edge portions of cable guide member 40 are separated from each other).

First abutting portion 4422 and second abutting portion 4424 are formed so as to protrude in a recessed shape from the end portion (protruding end portion) of first erected portion-main body 441 toward the side of edge portion 42b that is the other edge portion.

First abutting portion 4422 and second abutting portion 4424 are capable of sandwiching engaged portion 202.

Elastic piece 4446 of the present embodiment is provided in second abutting portion 4424, and extends out from the side of edge portion 42a on the one side toward the side of edge portion 42b on the other side. Protrusion portion 444 is formed at the leading-end of elastic piece 4446.

Thus, even when cable 30 that receives a load moves to support portion 42 or engaging portion 442, the state of engagement between protrusion portion 444 and hole 208 is maintained, and cable guide member 40 can be surely attached to guide rail 20 only by causing protrusion portion 444 and hole 208 to engage with each other.

In particular, when cable 30 receives a load to move to the side of support portion 42, protrusion portion 444 is inserted into hole 208 and does not come detached.

In the present embodiment, first erected portion 44 engages with guide rail 20 by insertion of engaged portion 202 of guide rail 20 into engaging portion 442 from the side of edge portion 42b on the other side.

In this case, both engaging portion 442 and engaged portion 202 are disposed in a direction opposite to support portion 42 with respect to linear portion 302 of cable 30.

Thus, as illustrated in FIG. 4A, the attachment to guide rail 20 is performed in a state in which movement of linear portion 302 of cable 30 in a direction away from one edge portion 20c of guide rail 20 outward and movement of linear portion 302 of cable 30 to a front surface (a side of a front surface of guide rail 20) are regulated by engaged portion 202 of guide rail 20, first erected portion-main body 441, and support portion 42.

Second erected portion 46 includes second erected portion-main body 461 that protrudes from a side of edge portion 42b of support portion 42 at a distance in which linear portion 302 is disposed between first erected portion 44 and second erected portion 46, and connecting portion 462 that is connected to a protruding end portion of second erected portion-main body 461 and to guide rail 20.

In second erected portion 46, connecting portion 462 is connected to connected portion 204 of guide rail 20.

In the present embodiment, connecting portion 462 is connected to connected portion 204 in a state in which second erected portion 46 is hooked to connected portion 204 and is suspended from connected portion 204, that is, in a state in which cable guide member 40 is suspended from guide rail 20.

In the present embodiment, by reception of a force by support portion 42 from cable 30 to which tension is applied, connecting portion 462 is configured to abut on connected portion 204 and to be connected to connected portion 204 in a direction in which the force is applied. That is, in a state in which cable guide member 40 is attached to guide rail 20 to support cable 30, connecting portion 462 presses connected portion 204 with a load by cable 30, and is in a state of being hooked to connected portion 204 and being suspended from connected portion 204.

First erected portion 44 and second erected portion 46 are provided in support portion 42 and are separated from each other in the direction in which cable 30 extends.

In the present embodiment, a plurality of second erected portions 46 are provided in support portion 42 such that second erected portions 46 are separated from each other in the direction in which cable 30 extends and sandwich first erected portion 44.

Thus, in cable guide member 40, linear portion 302 of cable 30 that is disposed on support portion 42 is disposed between first erected portion 44 on the side of edge portion 42a on the one side of support portion 42 and second erected portions 46 and 46 on the side of edge portion 42b on the other side of support portion 42.

Further, first erected portion 44 engages with engaged portion 202 of guide rail 20 in engaging portion 442 above support portion 42, and second erected portions 46 and 46 are connected to connected portion 204 of guide rail 20 above support portion 42.

Thus, linear portion 302 of cable 30 on support portion 42 is in a state of being disposed in a space (cable housing space S illustrated in FIG. 3) whose periphery is completely surrounded by support portion 42, first erected portion-main body 441 of first erected portion 44, second erected portion-main body 461 of second erected portion 46, engaging portion 442 of first erected portion 44, and engaged portion 202, which engages with engaging portion 442, of guide rail 20. Note that, on support portion 42, cable housing space S illustrated in FIG. 3 only indicates a space that is formed between support portion 42, first erected portion 44, and one of second erected portions 46, but is formed between support portion 42, first erected portion 44, and two of second erected portions 46 and 46 that sandwich first erected portion 44, respectively.

[Assembly Method of Cable Routing Structure 100]

Cable routing structure 100, specifically window-glass raising and lowering device 10 that uses cable routing structure 100, is assembled by attaching cable guide member 40 to guide rail 20 to which drive section 70, direction-changing member 80, carrier member 60 and cables 30 and 31 are attached.

That is, guide rail 20 is in a routing state in which cables 30 and 31 that connect drive section 70 with carrier member 60 are wound around direction-changing member 80 and cable 30 is routed. In this case, on the side of one edge portion 20c of guide rail 20, cable 30 is provided in a hanging manner in the region between drum 74 and direction-changing member 80 at both lower end 20a and upper end 20b of guide rail 20.

Then, cable guide member 40 is attached to the side of one edge portion 20c of the guide rail. In this attachment work, linear portion 302 of cable 30 is first inserted and disposed between support portion 42, first erected portion 44, and second erected portion 46 of cable guide member 40.

Since first erected portion 44 including engaging portion 442, and second erected portion 46 are provided in support portion 42 and are separated from each other in the direction in which cable 30 extends, cable 30 is easily inserted between first erected portion 44 and second erected portion 46 in comparison with a structure in which both first erected portion 44 and second erected portion 46 are disposed close to each other in the direction in which cable 30 extends. Then, cable guide member 40 is attached to guide rail 20 by causing engaging portion 442 of first erected portion 44 to engage with engaged portion 202 in a state in which connecting portion 462 of second erected portion 46 is hooked to connected portion 204.

Thus, cable routing structure 100 in which a closed structure from which cable 30 cannot be detached is formed around an axis of cable 30 disposed on support portion 42 is assembled.

Tension is applied to cable 30, which is disposed in a tensile state between lower end 20a and upper end 20b of guide rail 20 curved so as to protrude on a side of another surface 24, from the side of one surface 22 to the side of another surface 24, and cable 30 abuts on support portion 42, and thus, a force is applied to support portion 42.

Since engaging portion 442 and engaged portion 202 form the engagement relationship in which engaging portion 442 engages with engaged portion 202 in the direction of the force received by support portion 42 by the abutment of cable 30 on support portion 42, the state of engagement between each other becomes strong and both do not come detached from each other.

Further, connecting portion 462 of second erected portion 46 presses connected portion 204 in the direction of the force received by support portion 42 from cable 30 and is connected to connected portion 204, which results in a state in which cable guide member 40 is surely connected to guide rail 20 in a state in which cable guide member 40 is suspended from guide rail 20.

Thus, only by causing engaging portion 442 to engage with engaged portion 202, cable guide member 40 engages with guide rail 20, and the attachment is performed in a state in which connecting portion 462 is pressed against connected portion 204 and is suspended from connected portion 204, thereby enabling the cable routing structure to be easily realized.

Further, in cable routing structure 100 of the present embodiment, cable guide member 40 is attached to guide rail 20, for which a base portion is used, to support linear portion 302 that is intermediate between the both ends of cable 30 routed along guide rail 20.

In cable guide member 40, linear portion 302 of cable 30 is disposed between first erected portion 44 and second erected portion 46 on support portion 42, engaging portion 442 of first erected portion 44 engages with engaged portion 202 of guide rail 20, and connecting portion 462 of second erected portion 46 is connected to connected portion 204 of guide rail 20.

Thus, linear portion 302 is in a state of being disposed such that a periphery of linear portion 302 is three-dimensionally surrounded by support portion 42, first erected portion 44, second erected portion 46, and guide rail 20 that engages with engaging portion 442 of first erected portion 44 with engaged portion 202.

That is, in the routing state in which cable 30 is routed with cable guide member 40 being attached to guide rail 20, cable guide member 40 and the base member that is guide rail 20 in the present embodiment form a closed structure from which cable 30 cannot be detached, around the axis of cable 30 that is disposed on support portion 42.

Accordingly, it is possible to realize the cable routing structure using cable guide member 40 that is easily attached and from which cable 30 cannot easily come detached.

Further, cable guide member 40 in cable routing structure 100 of the present embodiment is configured to be connected to connected portion 204 of guide rail 20 by suspending cable guide member 40 from connected portion 204 of guide rail 20. Accordingly, even when connected portion 204 has a curved shape, it is not necessary to form cable guide member 40 into a curved shape that corresponds to the curved shape of connected portion 204. For this reason, the shape of cable guide member 40 is simplified, and it is possible to realize a good yield when manufacturing cable guide member 40 by using a resin or the like.

Note that, although first erected portion 44 and second erected portion 46 are formed in an L-shape with first erected portion-main body 441 and second erected portion-main body 461 that protrude from support portion 42, and with engaging portion 442 and connecting portion 462 that are provided by being bent from first erected portion-main body 441 and second erected portion-main body 461 in the present embodiment, the present invention is not limited thereto. Second erected portion 46 may be formed in any shape as long as the shape allows second erected portion 46 to be suspended from guide rail 20.

Further, protrusion portion 444 is provided on a side of second abutting portion 4424, but may be provided in any way as long as protrusion portion 444 has a shape protruding in a direction along a direction in which first erected portion 44 extends from support portion 42, that is, an erected direction of first erected portion 44 from support portion 42, and as long as protrusion portion 444 engages with hole 208. For example, protrusion portion 444 may be provided in first abutting portion 4422, in first erected portion 44.

[Modification of the Cable Guide Member]

Figure 5:
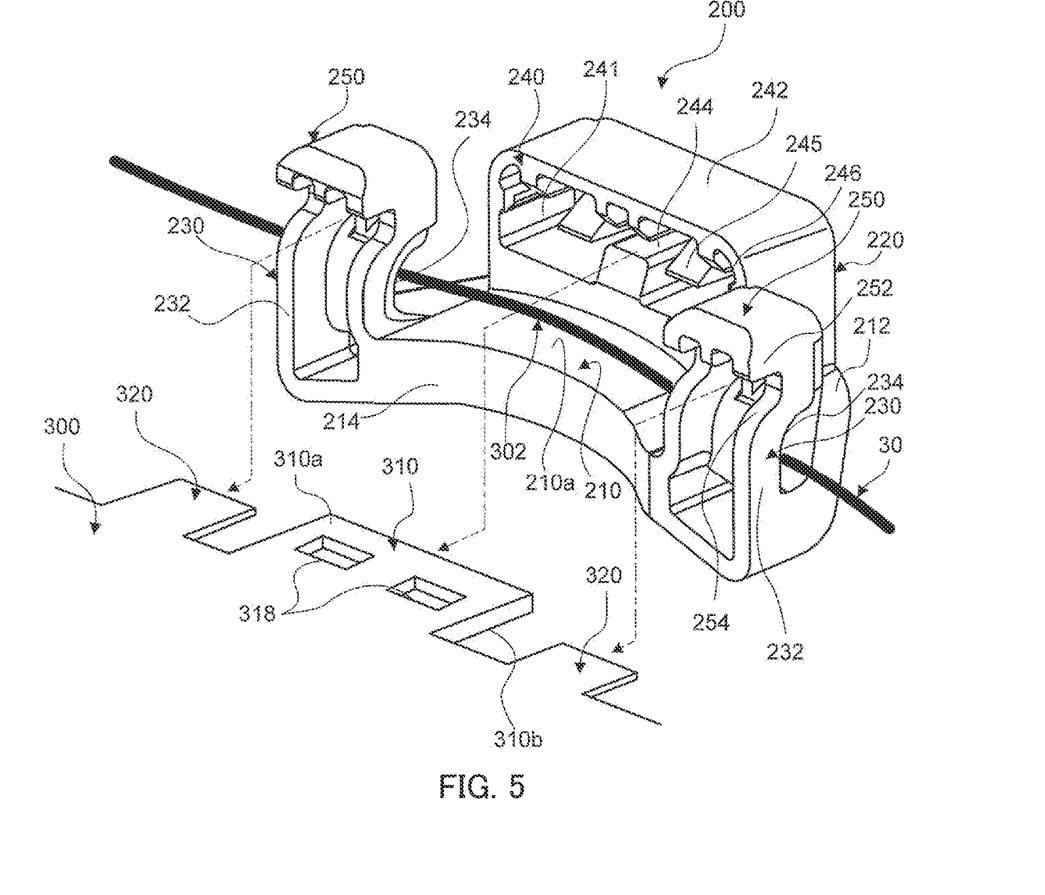
FIG. 5 is a diagram illustrating a modification of a cable guide member of the cable routing structure according to the embodiment of the present invention.

FIG. 5 is a diagram illustrating a modification of the cable guide member in Embodiment 1.

Cable guide member 200 illustrated in FIG. 5 has the same basic configuration as cable guide member 40. Accordingly, the same names will be given to similar components, and description of operation and effects thereof will be omitted.

Cable guide member 200 is attached to guide rail 300 used as the base member to configure a cable routing structure supporting linear portion 302 that is intermediate between the both ends of cable 30 routed along guide rail 300.

Cable guide member 200 includes support portion 210 that includes one edge portion 212 and another edge portion 214, first erected portion 220 that is erected on a side of one edge portion 212, and second erected portion 230 that is erected on a side of another edge portion 214.

Cable guide member 200 is made of a resin, and smoothly guides cable 30.

Supporting portion 210 includes supporting surface 210a that is curved along a direction in which the cable extends, and supports linear portion 302 of cable 30 routed on the supporting surface.

First erected portion 220 and second erected portion 230 are provided in the support portion and are separated from each other in the direction in which cable 30 extends.

First erected portion 220 and second erected portion 230 are erected on support portion 210 so as to allow a distance in which linear portion 302 of cable 30 is disposed between first erected portion 220 and second erected portion 230.

First erected portion 220 includes engaging portion 240 that engages with engaged portion 310 of guide rail 300 in an upper portion of first erected portion 220.

Engaging portion 240 includes opening 241 that opens to the side of another edge portion 214, and includes first abutting portion 242, second abutting portion 244, and elastic piece 246 that form opening 241. Protrusion portion 245 is provided at a leading-end of elastic piece 246.

Engaged portion 310 of guide rail 300 is inserted into opening 241 of engaging portion 240.

First abutting portion 242 and second abutting portion 244 sandwich engaged portion 310 that is inserted into opening 241. An outer peripheral wall of engaging portion 240 abuts on an end surface of engaged portion 310 in a direction in which guide rail 300 extends, thereby restraining cable guide member 200 from moving in the direction in which guide rail 300 extends.

In cable guide member 200, a plurality of protrusion portions 245 are provided side by side in the direction in which cable 30 extends.

Second erected portion 230 includes connecting portion 250 connected to connected portion 320 of guide rail 300.

Connecting portion 250 is formed in a U-shape that opens in an attachment direction to guide rail 300, and is configured to be suspended from connected portion 320 and to sandwich connected portion 320 in cable guide member 200.

That is, connecting portion 250 includes upper surface portion 252 forming an upper end surface of the U-shape, and lower surface portion 254 facing upper surface portion 252 below upper surface portion 252, that is, on a side of support portion 210. Upper surface portion 252 presses connected portion 320 from a side of one surface, and lower surface portion 254 is disposed to face a second surface portion of connected portion 320.

Further, connecting portion 250 is provided to protrude from an upper end portion of second erected portion-main body 232 that is erected perpendicularly from other end portion 214 of support portion 210 to a side of first erected portion 220. Thus, since connecting portion 250, that is, an upper end portion of second erected portion 230 protrudes to the side of first erected portion 220, cutout space 234 that is wide is formed below an end portion of the side of first erected portion 220 of connecting portion 250. Thus, the movement of cable 30, which is disposed on support portion 210, in a direction away from support portion 210 is regulated.

In guide rail 300 as the base member to which cable guide member 200 is attached, on the other hand, engaged portion 310 and connected portion 320 are provided at positions that correspond to the positions of first erected portion 220 and second erected portion 230.

Engaged portion 310 and connected portion 320 are board-like bodies protruding parallel to a front surface of guide rail 300 from one end portion of guide rail 300. Engaged portion 310 and connected portion 320 include first surface 310a and second surface 310b opposite to first surface 310a, which are substantially parallel to the direction in which cable 30 is routed. Engaged portion 310 and connected portion 320 are preferably formed integrally with guide rail 300. In engaged portion 310, a plurality of holes 318 into which protrusion portions 245 are insertable are formed correspondingly to protrusion portions 245.

When cable guide member 200 is attached to guide rail 300, cable 30 is disposed in a space surrounded by support portion 210, first erected portion 220, and second erected portion 230 of cable guide member 200.

Then, engaged portion 310 of guide rail 300 is inserted into opening 241 of engaging portion 240 of cable guide member 200. Similarly, connected portion 320 of guide rail 300 is inserted into a U-shaped opening of connecting portion 250 of second erected portion 230.

Thus, cable guide member 200 is suspended from guide rail 300 by pressing of upper surface portion 252 of connecting portion 250 on connected portion 320 by the tension of cable 30, and engaging portion 240 engages with engaged portion 310. The state of engagement between engaging portion 240 and engaged portion 310 is a state in which, while first abutting portion 242 and second abutting portion 244 sandwiching first surface 310a and second surface 310b of engaged portion 310, protrusion portion 245 is inserted into hole 318.

Thus, in a routing state in which cable 30 is routed with cable guide member 200 being attached to guide rail 300, cable 30 abuts on support portion 210, whereby cable guide member 200 and guide rail 300 form an engagement relationship in which engaging portion 240 engages with engaged portion 310 in a direction of a force applied to support portion 210 in accordance with the movement of cable 30. Further, cable guide member 200 is suspended from guide rail 300 in the direction of the force applied to support portion 210.

Further, in the same manner as in the cable routing structure, cable 30 on support portion 210 is in a state in which a periphery of cable 30 is completely surrounded by first erected portion 220, second erected portion 230, and engaged portion 310 that engages with first erected portion 220. That is, in the routing state, cable guide member 200 and the guide rail form a closed structure from which cable 30 cannot be detached, around an axis of cable 30 that is disposed on support portion 210.

Accordingly, cable guide member 200 is attached to guide rail 300, for which the base member is used, to become a cable routing structure that has the same operational effects as cable routing structure 100.

The embodiments of the present invention have been described thus far. Note that, the above description is only illustration of preferred embodiments of the present invention, and the scope of the present invention is not limited thereto. That is, the descriptions of the configuration of the above-mentioned device and the shape of each portion are only exemplary, and it is obvious that various changes and additions to these examples are possible within the scope of the present invention.

INDUSTRIAL APPLICABILITY

The cable routing structure according to the present invention uses a cable guide that is easily attached and from which a cable cannot easily come detached, and is applicable to a window-glass raising and lowering device, such as a window regulator.

REFERENCE SIGNS LIST

10 Window glass raising and lowering device
20, 300 Guide rail
20a Lower end
20b Upper end
20c, 212 One edge portion
20d, 214 Another edge portion
22 One surface
24 Another surface
30, 31 Cable
40, 200 Cable guide member
42, 210 Support portion
42a, 42b Edge portion
44, 220 First erected portion
46, 230 Second erected portion
60 Carrier member
70 Drive section
72 Motor
74 Drum
80 Direction-changing member
82 Pulley
84 Pulley shaft
100 Cable routing structure
202, 310 Engaged portion
204, 320 Connected portion
208, 318 Hole
222, 310a First surface
224, 310b Second surface
234 Cutout space
240, 442 Engaging portion
241 Opening
242, 4422 First abutting portion
244, 4424 Second abutting portion
245, 444 Protrusion portion
246 Elastic piece
250, 462 Connecting portion
252 Upper surface portion
254 Lower surface portion
302 Linear portion
308, 318 Hole
441 First erected portion-main body
461, 232 Second erected portion-main body
4446 Elastic piece

What is claimed is:

1. A cable routing structure, comprising:
   a base member;
   a cable that is routed along the base member; and
   a cable guide member that is attached to the base member and supports a linear portion of the cable, the linear portion being intermediate between both ends of the cable, wherein
   the cable guide member includes a support portion that includes an edge portion on one side and an edge portion on another side, a first erected portion that is erected on a side of the edge portion on the one side, and a second erected portion that is erected on a side of the edge portion on the other side, wherein
      the first erected portion includes an engaging portion that engages with the base member,
      the second erected portion includes a connecting portion that is connected to the base member, and
      a distance in which the linear portion is disposed is provided between the first erected portion and the second erected portion,
   the base member includes an engaged portion that is engaged with the engaging portion of the first erected portion,
   in a routing state in which the cable is routed with the cable guide member being attached to the base member, the cable guide member and the base member form an engagement relationship in which the engaging portion engages with the engaged portion in a direction of a force received by the support portion by abutment of the cable on the support portion,
   in the routing state, the cable guide member and the base member form a closed structure around an axis of the cable disposed on the support portion, the closed structure not allowing the cable to be detached, and
   when the cable guide member is detached from the base member, the cable is detachable from the cable guide member.

2. The cable routing structure according to claim 1, wherein
   the engaging portion includes a protrusion portion protruding in a direction in which the first erected portion extends from the support portion, and the engaged portion includes a hole into which the protrusion portion is insertable.

3. The cable routing structure according to claim 2, wherein
   the engaged portion of the base member includes a first surface and a second surface opposite to the first surface, the first surface and the second surface being substantially parallel to the direction in which the cable is routed,
   the engaging portion of the cable guide member includes a first abutting portion that abuts on the first surface, a second abutting portion that abuts on the second surface, and an elastic piece that is provided with the protrusion portion at a leading-end of the elastic piece, and
   the engaging portion is capable of sandwiching the engaged portion with the first abutting portion and the second abutting portion.

4. The cable routing structure according to claim 1, wherein
   the first erected portion and the second erected portion are provided in the support portion and are separated from each other in a direction in which the cable extends.

5. A window-glass raising and lowering device using the cable routing structure according to claim 1, comprising:
   a guide rail for which the base member is used;
   a carrier member that is guided by the guide rail;
   a drive section; and
   the cable, wherein
   the cable is connected to the carrier member and the drive section, and
   the carrier member moves by driving of the drive section.

* * * * *